Figure 4:
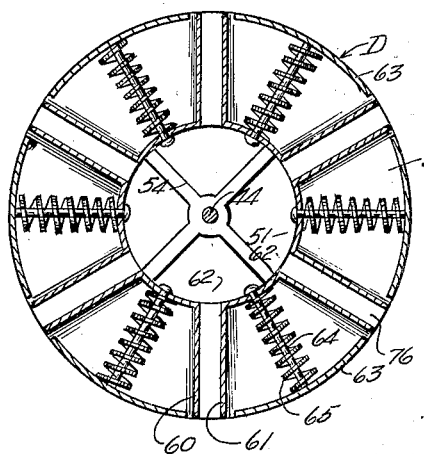

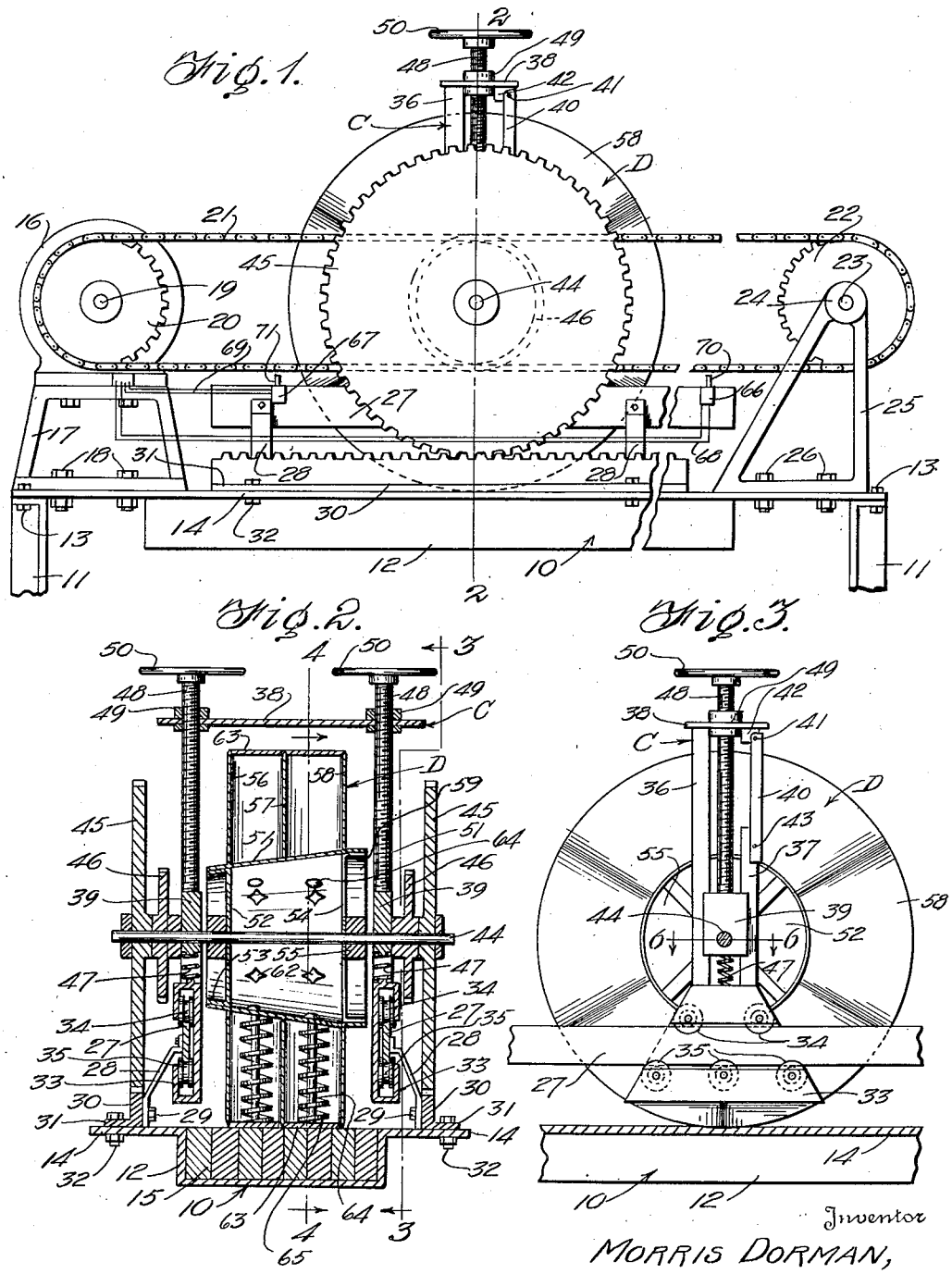

Patented June 20, 1939

2,163,487

UNITED STATES PATENT OFFICE 2,163,487

TRAVELING ROTARY DIE

Morris Dorman, Baltimore, Md.

Application May 18, 1938, Serial No. 208,709

6 Claims. (Cl. 164—28)

This invention relates to die cutters, and more particularly to an improvement in rotary die cutters.

An object of this invention is to provide a rotary die cutter which is so constructed that it may be mounted on a movable or traveling carriage, the die including means for picking up the small or scrap material and also including means for ejecting the cut pieces from the die as the device moves along the guide means for the die.

Another object of this invention is to provide a traveling die with a reversible motor at one end of a base structure which is connected to the carriage in such a manner that the carriage with the die may be moved back and forth along the base in order to cut out the material from the sheet resting on the base.

A further object of this invention is to provide a rotary die cutter of this kind which is so constructed that the rotary die may be readily removed from the traveling carriage so that different types of dies may be used with the same machine.

A still further object of this invention is to provide in a traveling die carriage means whereby the die may be tensioned against the material which is being cut, the machine also including an improved base structure in the form of wooden blocks or the like which are placed with the grain in a vertical position so that movement of the die over the base will not cut slivers or the like from the base.

Still another object of the invention is to provide in a rotary die means formed centrally of the die for discharging the small pieces or scrap at one side of the carriage as the device moves along the blank sheet.

To the foregoing objects and to others which may hereinafter appear, the invention consists of the novel construction combination and arrangement of parts as will be more specifically described and illustrated in the accompanying drawings, wherein is shown an embodiment of the invention, but it is to be understood that changes, variations and modifications may be resorted to which fall within the scope of the invention as claimed.

Figure 5:
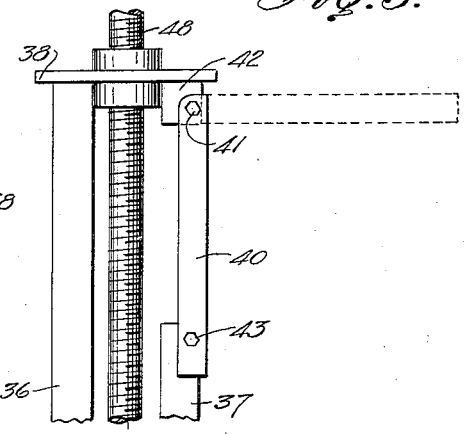
Figure 6:
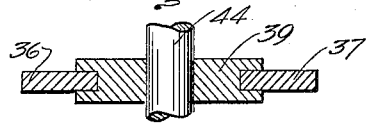
Figure 7:
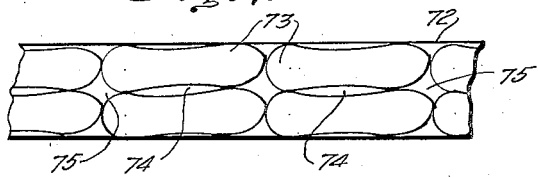
Figure 8:
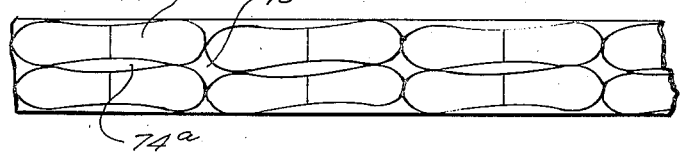
Figure 9:
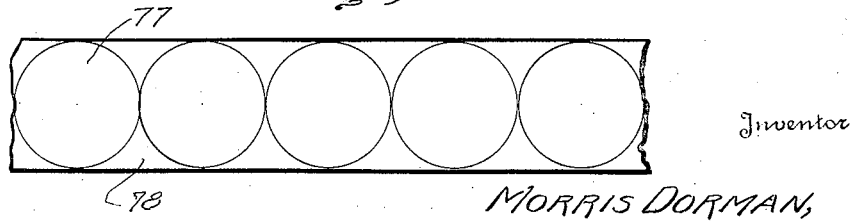

In the drawings:

Figure 1 is a detail side elevation partly broken away of a traveling rotary die constructed according to an embodiment of this invention, Figure 2 is a sectional view taken on the line 2—2 of Figure 1, Figure 3 is a sectional view taken on the line 3—3 of Figure 2, Figure 4 is a sectional view through the rotary cutter taken on the line 4—4 of Figure 2, Figure 5 is an enlarged fragmentary side elevation of the upper portion of the carriage, Figure 6 is a fragmentary sectional view taken on the line 6—6 of Figure 3, Figure 7 is a fragmentary plan view of a blank showing the shape of the material cut by one of the die members, the material being in the form of whole soles, Figure 8 is a fragmentary plan view of another blank showing the cutting of half soles from a piece of leather, and Figure 9 is a fragmentary plan view of a further blank wherein discs are cut from a sheet of material.

Referring to the drawings, the numeral 10 designates generally a base structure which is supported by supporting members 11 secured to the base 10 adjacent the ends thereof by means of bolts 13 or the like. The base structure 10 comprises a channel portion or box 12 provided with laterally projecting flanges 14 along the longitudinal edges thereof. The channel or box portion 12 opens upwardly and a plurality of blocks 15 are disposed in the channel member 12, the blocks 15 being disposed in a position with the grain thereof vertical so that the ends of the grain will be disposed for engagement with the rotary cutter to be hereinafter described.

A motor 16 is disposed at one end of the base 10 being supported on a base structure 17 in a position above the base 10 with the base 17 secured to the base 10 by means of bolts 18 or the like. The motor 16 is a reversible motor and is adapted to be connected to a suitable source of electric current supply. The motor 16 is provided with an armature or drive shaft 19 on which a sprocket or gear member is secured. Preferably, the shaft 19 extends on opposite sides of the motor 16 and a pair of sprocket or gear members 20 are secured. A pair of endless flexible members in the form of power transmission chains 21 are trained over the sprockets 20 and the parallel or straight runs of each chain 20 extend above and in parallel relation to the upper surface of the base 10. A pair of idler sprocket members 22 are secured to an idler shaft 23 and the idler shaft 23 is supported by means of bearings 24 carried by bearing supports 25. The bearing supports 25 are secured to the base 10 on that side thereof opposite to which the support 17 for the motor 16 is arranged by means of bolts or fastening members 26.

A pair of elongated guide bars 27 are supported above the base 10 by means of brackets 28. The brackets 28 extend downwardly and outwardly from the guide members 27 and the lower ends of the bracket members 28 are secured as by fastening members 29 to the inner sides of a pair of spaced parallel upstanding rack bars 30. Each rack bar 30 is provided with a right angular horizontally disposed base leg 31 which is secured by means of bolts 32 to the flanges 14. These rack bars 30 are arranged on opposite sides of the channel 12 as shown in Figure 2. The bracket members 28 extend upwardly and inwardly from the rack members 30 so as to suspend the guide members 27 inwardly of and in a position above the rack bars 30.

A slidable carriage generally designated as C is adapted to be disposed between the pair of chains 21 and the carriage C comprises a pair of vertically disposed trolleys formed of a pair of oppositely disposed spaced parallel substantially C-shaped members 33, which are provided with a plurality of spaced apart upper and lower rollers 34 and 35 respectively engaging on the upper and lower edges of the guide bars 27. A pair of upstanding supporting bars 36 and 37 are secured to the upper end of a member 33. The supporting bars 36 are secured at their upper ends to a horizontally disposed bar or cross head 38. The bars 36, 37 of each pair are disposed in parallel spaced relation and coact to constitute a combined guide and confining means for a vertically movable slide member 39. The guide bar 37 is relatively shorter in length than the guide bar 36 so that the slide member or block 39 may be moved upwardly and then withdrawn from between the bars 36 and 37 at a point above the upper ends of the bars 37.

Latching members 40, in the form of short bars are pivotally secured, as at 41 to spaced blocks 42 carried by and disposed on the lower face of cross head 38. The members 40 are provided for bridging the space between the upper ends of the bars 37 and the cross head 38. The members 40 are latched, as at 43 to the bars 37 by a bolt or other suitable means. The slide members 39 constitute bearing blocks through which a shaft 44 is journalled. The shaft 44 is provided adjacent each end thereof with a relatively large gear or toothed wheel 45 which is adapted to engage the teeth of the rack bars 30. The shaft 44 is also provided with a pair of sprocket members 46 which are fixed to the shaft 44 inwardly of the gear wheels 45. The sprocket members 46 are adapted to engage the upper and lower runs of the chains 21 so that as the chains 21 are simultaneously driven by rotation of the drive gears 20 the sprocket members 46 will be rotated and with the rotation of the sprocket members 46, the shaft 44 will be rotated and this in turn will effect movement of the carriage C in one direction by reason of the engagement of the gear wheels 45 with the fixed rack members 30.

The bearing blocks 39 are tensioned under the action of springs 47 which are interposed between the lower ends of the bearing blocks 39 and the upper ends of the roller carrying members 33. A pair of threaded shafts 48 are threaded through bosses 49 carried by the transverse bar 38 adjacent the opposite ends thereof and the lower ends of the threaded shafts 48 engage against the upper sides of the bearing blocks 39 and serve as a means for tensioning the springs 47. Each threaded shaft 48 is provided at its upper end with a hand wheel or operating member 50.

The shaft 44 is adapted to have a rotary die member generally designated as D loosely mounted thereon and this die member D comprises a hollow inner or hub section 51 which is substantially frusto-conical in configuration. A plate 52 having a frusto-conical flange 53 is loose on shaft 44 and the flange 53 engages in the small end of the hub 51, being frictionally held therein, or if desired, fastening devices in the form of bolts or the like may be used to hold the hub 51 onto the flange 53. A spider 54 having a flange 59 on the outer edge thereof engages in the larger end of the hub 51 being frictionally or otherwise held therein. The spider 54 has a hub or boss 55 which loosely engages the shaft 44. The spokes of the spider or wheel 54 provide means whereby the material deposited in the hub member 51 may be discharged at one side of the die member D.

The rotary die member D includes a plurality of spaced apart cutting members or plates 56, 57 and 58 which are secured to the frusto-conical hub member 51. The cutting blades 56, 57 and 58 are provided with suitable configurations so as to blank out the desired article from a blank sheet and in the present instance these blade members are formed to cut out either whole soles or half soles from a sheet of leather or composition material. The blade members 56, 57 and 58 are connected together by means of connecting members 60 and 61 which provide a channel therebetween and the connecting members 60 and 61 have keen outer edge portions coacting with the blades 56, 57 and 58 in cutting out the intermediate portions between the various soles or half soles. The web or channel members 60 and 61 open as at 62 through the hub member 51 so that the scrap material cut out by these web members 60 and 61 will pass inwardly to the inside of the hub member 51 and then be discharged out through the larger end of this hub member 51. The die member D is provided with a plurality of plunger or ejecting members 63 which are disposed between the web members 60 and 61 and between adjacent cutting plates 56 and 57 or 57 and 58. The plungers or ejecting members 63 are each provided with a headed bar 64 which slidably engages through the hub member 51 and an expanding spring 65 engages about the bar 64 between the hub member 51 and the plunger 63 so as to constantly urge the plunger 63 outwardly.

In the use and operation of this device, the sheet of material which it is desired to blank out is placed on the base or table 10 and the motor 16 is then operated to move the carriage from one end of the guide means 27 to the other end. In order to provide a means whereby the carriage C will stop at the proper place adjacent each end of the guide members 27, I have provided a pair of cut-off switch members 66 and 67 which are connected by conductors 68 and 69 respectively to the motor 16. The switch members 66 and 67 are each provided with a projection or switch operating arm 70 and 71 respectively disposed in the path of the carriage portion 33 on one of the guide members 27. In this manner the carriage C will automatically cut off the current to the motor 16 after the die member D has passed over the adjacent end of the blank sheet. The die member D is tensioned against the base 10 by means of the tensioning members 48 and as the die member D rotates under the action of the gears 46 and 45 the sheet of material will be pressed out and the plunger 63 will eject the pressed out material from the cutters 56, 57 and 58.

In Figure 7 there is disclosed a sheet 72 and whole soles 73 are shown as being cut out from the sheet 72. The outer edges of the soles 73 are disposed relatively close to the longitudinal edges of the sheet 72 so that very little waste material will have to be cut out from the sheet 72. However, where the soles 73 are in side-by-side relation there will be a piece 74 of scrap and where the adjacent ends of two pairs of soles 73 come together there will be a scrap portion 75. These scrap portions 74 and 75 will be cut out by the web or connecting members 60 and 61, these members 60 and 61 being so shaped that they will properly cut out the material between the several pairs of soles. The scrap material disclosed at 74 and 75 will pass inwardly in the channel 76 formed by the web members or channel members 60 and 61 and will then pass into the interior of the hub 51 and then be discharged through the larger end of this hub member 51.

In Figure 8 there is disclosed a blank sheet from which half soles 73a are cut out and in this construction the scrap portions 74a and 75a are somewhat similar in size to the scrap portions 74 and 75.

In Figure 9 there is disclosed a blank wherein discs 77 are cut out of a blank sheet of material and in a construction of this kind, certain portions of the die member D may be eliminated, namely, the scrap channels 76. Where the discs 77 are being cut, the scrap 78 will remain on the base 10.

What I claim is:

1. A die cutter comprising a base, a guide means carried by said base, a carriage movably engaging said guide means, means for moving said carriage on said guide means, a die rotatably carried by said carriage, tensionable means urging said die in the direction of said base whereby to cut an article engaging on said base upon movement of said carriage and die thereover, and means positioned adjacent the end of each stroke of said carriage whereby to automatically cut off said carriage moving means.

2. A die cutter comprising a base, guide means carried by the base, a carriage movably engaging said guide means, electrical operating means for said carriage, a die rotatably carried by said carriage, means disposed adjacent each end of the movement of said carriage to disconnect said operating means, and tensionable means urging said die in the direction of said base.

3. A die cutter comprising a base, guide means carried by said base, a carriage movably engaging said guide means, means for moving said carriage back and forth along said guide means, a die rotatably engaging said carriage, ejecting means carried by said die, and means carried by said die for removing the scrap material cut out by said die.

4. In a die cutter, a base, a pair of spaced parallel rack bars on the base, a pair of spaced parallel guide members, means anchored to the base for suspending said members above and inwardly adjacent to said rack bars, a carriage including trolleys supported by and slidably engaging said members and also including a pair of normaly closed combined supporting, confining, and guide means mounted on the tops of the trolleys, vertically slidable tensioned bearings removably mounted in said guide means, a driving structure including a prime mover and a pair of spaced parallel traveling endless power transmitting elements driven from said prime mover and between which is arranged said carriage, a shaft journaled in said bearings and provided with sprocket wheels driven from said elements and gear wheels engaging with said racks for bodily moving the shaft and carriage horizontally in unison, and a die member arranged within the carriage and revolubly mounted on the shaft.

5. In a die cutter, a base, a pair of spaced parallel rack bars on the base, a pair of spaced parallel guide members, means anchored to the base for suspending said members above and inwardly adjacent to said rack bars, a carriage including trolleys supported by and slidably engaging said members, and also including a pair of normally closed combined supporting, confining, and guide means mounted on the tops of the trolleys, vertically slidable tensioned bearings removably mounted in said guide means, a driving structure including a prime mover and a pair of spaced parallel traveling endless power transmitting elements driven from said prime mover and between which is arranged said carriage, a shaft journaled in said bearings and provided with sprocket wheels driven from said elements and gear wheels engaging with said racks for bodily moving the shaft and carriage horizontally in unison, a die member arranged within the carriage and revolubly mounted on the shaft, and means for controlling the operation of said driving structure to provide for said shaft and carriage bodily moving in unison alternately in opposite horizontal paths and for reversing the direction of revolving of the die member at the extent of movement of the shaft and carriage in unison at the ends of said paths.

6. In a die cutter, a base, a pair of spaced parallel rack bars on the base, a pair of spaced parallel guide members, means anchored to the base for suspending said members above and inwardly adjacent to said rack bars, a carriage including trolleys supported by and slidably engaging said members, and also including a pair of normally closed combined supporting, confining, and guide means mounted on the tops of the trolleys, vertically slidable tensioned bearings removably mounted in said guide means, a driving structure including a prime mover and a pair of spaced parallel traveling endless power transmitting elements driven from said prime mover and between which is arranged said carriage, a shaft journaled in said bearings and provided with sprocket wheels driven from said elements and gear wheels engaging with said racks for bodily moving the shaft and carriage horizontally in unison, a die member arranged within the carriage and rotatably mounted on said shaft, ejecting means carried by said die member, and means for removing the scrap material cutout by the said die member.

MORRIS DORMAN.